United States Patent
Kazariya et al.

(10) Patent No.: US 11,608,425 B2
(45) Date of Patent: Mar. 21, 2023

(54) RUBBER COMPOSITION FOR TIRE, AND PNEUMATIC TIRE

(71) Applicant: THE YOKOHAMA RUBBER CO., LTD., Tokyo (JP)

(72) Inventors: Ayaki Kazariya, Hiratsuka (JP); Makoto Ashiura, Hiratsuka (JP); Satoshi Mihara, Hiratsuka (JP); Kazuya Uenishi, Hiratsuka (JP); Yu Shinke, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 401 days.

(21) Appl. No.: 16/753,225

(22) PCT Filed: Oct. 4, 2018

(86) PCT No.: PCT/JP2018/037161
§ 371 (c)(1),
(2) Date: Apr. 2, 2020

(87) PCT Pub. No.: WO2019/070016
PCT Pub. Date: Nov. 4, 2019

(65) Prior Publication Data
US 2020/0325310 A1    Oct. 15, 2020

(30) Foreign Application Priority Data

Oct. 5, 2017 (JP) .............................. JP2017-194897
Oct. 5, 2017 (JP) .............................. JP2017-194947

(51) Int. Cl.
| | |
|---|---|
| C08L 9/06 | (2006.01) |
| C08K 3/36 | (2006.01) |
| C08K 5/544 | (2006.01) |
| B60C 1/00 | (2006.01) |
| C08F 236/06 | (2006.01) |

(52) U.S. Cl.
CPC .............. C08K 3/36 (2013.01); B60C 1/0016 (2013.01); C08F 236/06 (2013.01); C08L 9/06 (2013.01); C08F 2810/40 (2013.01); C08K 2201/006 (2013.01); C08L 2205/025 (2013.01); C08L 2205/03 (2013.01)

(58) Field of Classification Search
CPC .. C08L 9/06; B60C 1/00; C08K 5/544; C08K 3/36

USPC ......................................................... 523/156
See application file for complete search history.

(56) References Cited

U.S. PATENT DOCUMENTS

| 9,745,454 B2 | 8/2017 | Nakatani | |
| 2004/0054065 A1* | 3/2004 | Zanzig | B60C 1/00 |
| | | | 525/192 |
| 2016/0355057 A1* | 12/2016 | Kato | B60C 1/00 |
| 2018/0072874 A1 | 3/2018 | Kato et al. | |
| 2018/0282446 A1* | 10/2018 | Uenishi | C08F 4/52 |

FOREIGN PATENT DOCUMENTS

| JP | 2009-287020 A | 12/2009 | |
| JP | 2011-162625 A | 8/2011 | |
| JP | 2014-015583 A | 1/2014 | |
| JP | 2014-028902 A | 2/2014 | |
| JP | 2015-218196 A | 12/2015 | |
| JP | 2016-008284 A | 1/2016 | |
| JP | 2016-065175 A | 4/2016 | |
| JP | 2016-199709 A | 12/2016 | |
| JP | 2017-031356 A | 2/2017 | |
| JP | 2017-039821 A | 2/2017 | |
| JP | 2017-122190 A | 7/2017 | |
| WO | WO-2015114996 A1 * | 8/2015 | ............... B60C 1/00 |
| WO | WO-2017043553 A1 * | 3/2017 | ............. C08C 19/22 |

OTHER PUBLICATIONS

Office Action dated May 16, 2022, to the corresponding German Patent Application 11 2018 004 472.6, with a partial English translation thereof.

* cited by examiner

*Primary Examiner* — Deve V Hall
(74) *Attorney, Agent, or Firm* — Carrier Shende & Associates, P.C.; Joseph P. Carrier; Anne G. Sabourin

(57) ABSTRACT

A rubber composition for a tire contains a diene rubber, silica, and a specific modified butadiene polymer, wherein the diene rubber contains an aromatic vinyl-conjugated diene rubber A and at least one rubber component B selected from an aromatic vinyl-conjugated diene rubber b1 other than the rubber A and a butadiene rubber b2 having a weight average molecular weight of ≥15000. A content of the aromatic vinyl-conjugated diene rubber A is from 30 to 90% by mass, and a content of the rubber component B is from 10 to 70% by mass, an average TG of the diene rubber is lower than −20° C., a content of the silica is from 80 to 200 parts by mass per 100 parts by mass of the diene rubber, and a content of the modified butadiene polymer is from 1.0 to 25.0% by mass with respect to content of the silica.

15 Claims, 1 Drawing Sheet

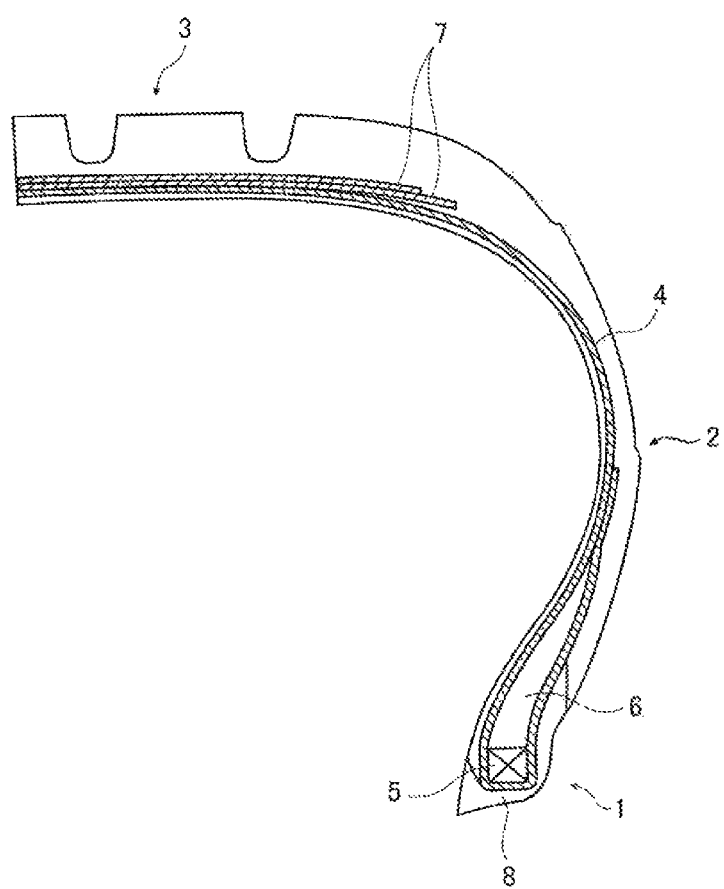

RUBBER COMPOSITION FOR TIRE, AND PNEUMATIC TIRE

TECHNICAL FIELD

The present invention relates to a rubber composition for a tire and a pneumatic tire.

BACKGROUND ART

In recent years, there has been a demand to reduce tire pyrogenicity (hysteresis loss) from the perspective of fuel efficiency when a vehicle is traveling. A known method of achieving this is a method for reducing the tire pyrogenicity by blending silica into a rubber component constituting a tread portion of a tire.

However, since silica has low affinity with a rubber component, and the cohesiveness between silica particles is high, even when silica is simply blended into a rubber component, the silica is not dispersed, which leads to the problem that the effect of reducing the pyrogenicity cannot be achieved sufficiently.

For example, in examples of Patent Document 1, a composition containing a styrene-butadiene rubber (SBR), a butadiene rubber (BR), and silica is described.

Furthermore, for example, in examples of Patent Document 2, a composition containing two kinds of styrene-butadiene rubbers (SBR), a butadiene rubber (BR), and silica is described.

CITATION LIST

Patent Literature

Patent Document 1: JP 2014-28902 A
Patent Document 2: JP 2011-162625 A

SUMMARY OF INVENTION

Technical Problem

Environmental problems, resource problems, and the like have led to a demand for even better fuel efficiency in vehicles, which in turn has led to a demand for further improvement in the dispersibility of silica (silica dispersibility) for a rubber composition for a tire containing silica. There is also a demand for improvements in WET performance (WET steering stability: steering stability on wet road surface) in accordance with the improvement of safety levels to be required. In addition, from the viewpoint of manufacturing efficiency, there is a demand for further improvement in workability (reduction in viscosity).

In this way, when the inventors of the present invention have prepared a rubber composition with reference to the examples of Patent Documents 1 and 2, it has been clearly found that a rubber composition that satisfies all of the characteristics described above at a high level is not necessarily obtained.

Therefore, in light of the above circumstances, an object of the present invention is to provide a rubber composition for a tire which is excellent in workability and silica dispersibility, and which is excellent in WET performance (WET steering stability) and fuel efficiency, when used in a tire; and a pneumatic tire manufactured by using the rubber composition for a tire.

Solution to Problem

As a result of diligent research on the problems described above, the inventors of the present invention have found that the problems described above can be solved by blending a specific modified butadiene polymer with silica at a specific quantitative ratio, and thus have completed the present invention.

Specifically, the inventors of the present invention have found that the problems described above can be solved by the following features.

(1) A rubber composition for a tire containing a diene rubber; silica; and a modified butadiene polymer, the diene rubber containing an aromatic vinyl-conjugated diene rubber A and at least one rubber component B selected from the group consisting of an aromatic vinyl-conjugated diene rubber b1 other than the aromatic vinyl-conjugated diene rubber A and a butadiene rubber b2 having a weight average molecular weight of greater than 15000, the aromatic vinyl-conjugated diene rubber A being a terminal-modified aromatic vinyl-conjugated diene rubber having an aromatic vinyl content from 35 to 45% by mass and a vinyl unit content from 25 to 45% by mole, in the diene rubber, a content of the aromatic vinyl-conjugated diene rubber A being from 30 to 90% by mass, and a content of the rubber component B being from 10 to 70% by mass, an average glass transition temperature of the diene rubber being lower than $-20°$ C., the modified butadiene polymer being a terminal-modified butadiene polymer having a weight average molecular weight from 1000 to 15000, and a molecular weight distribution of 2.0 or less, a content of the silica being from 80 to 200 parts by mass per 100 parts by mass of the diene rubber, and a content of the modified butadiene polymer being from 1.0 to 25.0% by mass with respect to the content of the silica.

(2) The rubber composition for a tire according to (1) above, in which in the diene rubber, the content of the aromatic vinyl-conjugated diene rubber A may be from 50 to 90% by mass, and the content of the rubber component B may be from 10 to 50% by mass, and the average glass transition temperature of the diene rubber may be $-45°$ C. or higher and lower than $-20°$ C.

(3) The rubber composition for a tire according to (1) above, in which in the diene rubber, the content of the aromatic vinyl-conjugated diene rubber A may be from 30 to 50% by mass, and the content of the rubber component B may be from 50 to 70% by mass, and the average glass transition temperature of the diene rubber may be lower than $-45°$ C.

(4) The rubber composition for a tire according to any one of (1) to (3) above, in which the modified butadiene polymer may have a functional group containing a nitrogen atom and a silicon atom at a terminal.

(5) The rubber composition for a tire according to any one of (1) to (4) above, in which the silica may have a cetyltrimethylammonium bromide (CTAB) adsorption specific surface area from 150 to 300 $m^2/g$.

(6) The rubber composition for a tire according to any one of the above (1) to (5), further containing a silane coupling agent, wherein a content of the silane coupling agent may be from 1 to 20% by mass based on the content of the silica.

(7) A pneumatic tire having the rubber composition for a tire described in any one of the above (1) to (6) disposed in a cap tread.

Advantageous Effects of Invention

As described below, according to the present invention, it is possible to provide a rubber composition for a tire which is excellent in workability and silica dispersibility, and which is excellent in WET performance (WET steering stability) and fuel efficiency, when used in a tire; and a pneumatic tire manufactured by using the rubber composition for a tire.

BRIEF DESCRIPTION OF DRAWINGS

FIG. 1 is a partial cross-sectional schematic view illustrating an example of a pneumatic tire according to an embodiment of the present invention.

DESCRIPTION OF EMBODIMENTS

Hereinafter, a rubber composition for a tire of an embodiment of the present invention and a pneumatic tire using the rubber composition for a tire will be described.

In the present specification, numerical ranges indicated using "(from) . . . to . . . " include the former number as the lower limit value and the latter number as the upper limit value.

Furthermore, for each of the components contained in the rubber composition for a tire according to an embodiment of the present invention, one type may be used alone, or two or more types may be used in combination. Here, in a case where two or more types of each component are used in combination, the content of the component refers to the total content unless otherwise specified.

Rubber Composition for a Tire

A rubber composition for a tire according to an embodiment of the present invention (hereinafter, also referred to as "composition according to an embodiment of the present invention") contains a diene rubber, silica, and a modified butadiene polymer.

Here, the diene rubber contains an aromatic vinyl-conjugated diene rubber A and at least one rubber component B selected from the group consisting of an aromatic vinyl-conjugated diene rubber b1 other than the aromatic vinyl-conjugated diene rubber A and a butadiene rubber b2 having a weight average molecular weight of greater than 15000.

Furthermore, the aromatic vinyl-conjugated diene rubber A is a terminal-modified aromatic vinyl-conjugated diene rubber having an aromatic vinyl content from 35 to 45% by mass and a vinyl unit content from 25 to 45% by mole.

Additionally, in the diene rubber, a content of the aromatic vinyl-conjugated diene rubber A is from 30 to 90% by mass, and a content of the rubber component B is to from 10 to 70% by mass.

In addition, an average glass transition temperature of the diene rubber is lower than −20° C.

Furthermore, the modified butadiene polymer is a terminal-modified butadiene polymer having a weight average molecular weight from 1000 to 15000, and a molecular weight distribution of 2.0 or less.

The content of the silica is from 80 to 200 parts by mass per 100 parts by mass of the diene rubber.

Furthermore, the content of the modified butadiene polymer is 1.0 to 25.0% by mass with respect to the content of the silica.

The composition according to an embodiment of the present invention is considered to achieve the above effects as a result of having such a configuration. Although the reason for this is not clear, it is presumed that the dispersibility of the silica is improved by the modified butadiene polymer interacting with the silica.

Here, as a result of investigation of the inventors of the present invention, it has been found that the criticality is seen between the size (weight average molecular weight, molecular weight distribution) of the modified butadiene polymer and the dispersibility of the silica. The reason for this is presumed that when the size of the modified butadiene polymer is within a specific range, the modified butadiene polymer will intervene in a gap between aggregates of the silica extremely easily. In this way, it is considered that extremely high silica dispersibility is achieved by using the modified butadiene polymer having a particular size in an embodiment of the present invention.

Note that, a first preferable aspect of the composition according to an embodiment of the present invention is one in which in the diene rubber, the content of the aromatic vinyl-conjugated diene rubber A is from 50 to 90% by mass, and the content of the rubber component B is from 10 to 50% by mass, and the average glass transition temperature of the diene rubber is −45° C. or higher and lower than −20° C. The first preferable aspect is useful for a summer tire.

A second preferable aspect of the composition according to an embodiment of the present invention is one in which in the diene rubber, the content of the aromatic vinyl-conjugated diene rubber A is from 30 to 50% by mass, and the content of the rubber component B is from 50 to 70% by mass, and the average glass transition temperature of the diene rubber is lower than −45° C. The second preferable aspect is useful for a winter tire.

Each of the components included in the composition according to an embodiment of the present invention will be described in detail below.

Diene Rubber

The diene rubber contained in the composition according to an embodiment of the present invention contains an aromatic vinyl-conjugated diene rubber A and at least one rubber component B selected from the group consisting of an aromatic vinyl-conjugated diene rubber b1 other than the aromatic vinyl-conjugated diene rubber A and a butadiene rubber b2 having a weight average molecular weight of greater than 15000.

Furthermore, the aromatic vinyl-conjugated diene rubber A is a terminal-modified aromatic vinyl-conjugated diene rubber having an aromatic vinyl content from 35 to 45% by mass and a vinyl unit content from 25 to 45% by mole.

Additionally, in the diene rubber, a content of the aromatic vinyl-conjugated diene rubber A is from 30 to 90% by mass, and a content of the rubber component B is from 10 to 70% by mass.

In addition, an average glass transition temperature of the diene rubber is lower than −20° C.

Aromatic Vinyl-Conjugated Diene Rubber A

The aromatic vinyl-conjugated diene rubber A is a terminal-modified aromatic vinyl-conjugated diene rubber having an aromatic vinyl content from 35 to 45% by mass and a vinyl unit content from 25 to 45% by mole. Among these, from the perspective of achieving excellent workability and silica dispersibility, excellent WET performance (WET steering stability) and fuel efficiency when used in a tire, and excellent durability (particularly high-speed durability), braking performance on snow, heat resistance, cold resistance, deterioration resistance, contamination resistance, light resistance, and steering stability when used in a tire, a terminal-modified styrene-butadiene rubber (terminal-modified SBR) having an aromatic vinyl content from 35 to 45% by mass, and a vinyl unit content from 25 to 45% by mole is preferable. Hereinafter, "excellent workability and silica dispersibility, excellent WET performance (WET steering stability) and fuel efficiency when used in a tire, and excellent durability (particularly high-speed durability), braking performance on snow, heat resistance, cold resistance, deterioration resistance, contamination resistance, light resistance, and steering stability when used in a tire" is also referred to as "superior effect of the present invention".

Here, the aromatic vinyl-conjugated diene rubber is a copolymer of aromatic vinyl and conjugated diene, and may be a copolymer of aromatic vinyl, conjugated diene, and other monomers not corresponding to both aromatic vinyl and conjugated diene.

Aromatic Vinyl

Examples of the aromatic vinyl include styrene, 2-methylstyrene, 3-methylstyrene, 4-methylstyrene, alpha-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethyl aminoethylstyrene, and vinyl pyridine. Among these, from the perspective of achieving the superior effect of the present invention, the aromatic vinyl is preferably styrene.

Conjugated Diene

Examples of the conjugated diene include 1,3-butadiene, isoprene(2-methyl-1,3-butadiene), 2,3-dimethyl-1,3-butadiene, 2-chloro-1,3-butadiene, and 1,3-pentadiene. Among these, from the perspective of achieving the superior effect of the present invention, the conjugated diene is preferably 1,3-butadiene.

Other Monomers

Examples of the other monomers include α- and β-unsaturated nitriles such as acrylonitrile and methacrylonitrile; unsaturated carboxylic acids or acid anhydrides such as acrylic acid, methacrylic acid, and maleic anhydride; unsaturated carboxylic acid esters such as methylmethacrylate, ethylacrylate, and butylacrylate; and non-conjugated dienes such as 1,5-hexadiene, 1,6-heptadiene, 1,7-octadiene, dicyclopentadiene, and 5-ethylidene-2-norbornene.

The amount of the other monomers used is preferably 10% by mass or less, more preferably 5% by mass or less, and still more preferably from 4 to 0% by mass, of the total monomers used in the aromatic vinyl-conjugated diene rubber A from the perspective of achieving the superior effect of the present invention.

Aromatic Vinyl Content

The aromatic vinyl content of the aromatic vinyl-conjugated diene rubber A (content of repeating units derived from aromatic vinyl in the aromatic vinyl-conjugated diene rubber A) is from 35 to 45% by mass.

Note that, in the present specification, the aromatic vinyl content of the aromatic vinyl-conjugated diene rubber refers to the content (% by mass) of repeating units derived from aromatic vinyl in the aromatic vinyl-conjugated diene rubber.

Vinyl Unit Content

The vinyl unit content of the aromatic vinyl-conjugated diene rubber A is from 25 to 45% by mole. Among these, from the perspective of achieving the superior effect of the present invention, the vinyl unit content is preferably from 35 to 42% by mole.

Note that, in the present specification, the vinyl unit content of the aromatic vinyl-conjugated diene rubber refers to the proportion (% by mole) occupied by a repeating unit having a vinyl structure (for example, 1,2-vinyl structure in a case where the conjugated diene is 1,3-butadiene) among all the repeating units derived from the conjugated diene in the aromatic vinyl-conjugated diene rubber.

Terminal Modification

As described above, the terminal of the aromatic vinyl-conjugated diene rubber A is modified.

From the perspective of achieving the superior effect of the present invention, the aromatic vinyl-conjugated diene rubber A preferably has at least one functional group selected from the group consisting of an amino group, a hydroxy group, an epoxy group, an alkylsilyl group, an alkoxysilyl group, and a carboxy group, at the terminal, and more preferably has a hydroxy group at the terminal.

Content

The content of the aromatic vinyl-conjugated diene rubber A in the diene rubber is from 30 to 90% by mass.

In a case where the composition according to an embodiment of the present invention is the first preferable aspect described above, the content of the aromatic vinyl-conjugated diene rubber A in the diene rubber is preferably 60% by mass or greater, and more preferably 70% by mass or greater, from the perspective of achieving the superior effect of the present invention.

In addition, in a case where the composition according to an embodiment of the present invention is the second preferable aspect described above, the content of the aromatic vinyl-conjugated diene rubber A in the diene rubber is preferably from 30 to 40% by mass, from the perspective of achieving the superior effect of the present invention.

Rubber Component B

A rubber component B is at least one rubber component selected from the group consisting of an aromatic vinyl-conjugated diene rubber b1 other than the aromatic vinyl-conjugated diene rubber A and a butadiene rubber b2 having a weight average molecular weight of greater than 15000. Among these, from the perspective of achieving the superior effect of the present invention, c/(a the rubber component B is preferably the butadiene rubber b2.

Aromatic Vinyl-Conjugated Diene Rubber b1

The aromatic vinyl-conjugated diene rubber b1 is an aromatic vinyl-conjugated diene rubber other than the aromatic vinyl-conjugated diene rubber A described above. Among these, from the perspective of achieving the superior effect of the present invention, the styrene-butadiene rubber (SBR) other than the aromatic vinyl-conjugated diene rubber A described above is preferable.

Examples of the aromatic vinyl-conjugated diene rubber b1 include, among the aromatic vinyl-conjugated diene rubbers, an aromatic vinyl-conjugated diene rubber having an aromatic vinyl content of less than 35% by mass, an aromatic vinyl-conjugated diene rubber having an aromatic vinyl content of greater than 45% by mass, an aromatic vinyl-conjugated diene rubber having a vinyl unit content of less than 25% by mole, an aromatic vinyl-conjugated diene rubber having a vinyl unit content of greater than 45% by mole, and an aromatic vinyl-conjugated diene rubber of which terminal is not modified. Among these, from the perspective of achieving the superior effect of the present invention, an aromatic vinyl-conjugated diene rubber (particularly, styrene butadiene rubber (SBR)) having an aromatic vinyl content of less than 35% by mass and a vinyl unit content of more than 45% by mole, of which terminal is modified (particularly having a hydroxy group at the terminal) is preferable.

Note that, the definition of the aromatic vinyl-conjugated diene rubber and specific examples of each monomer are the same as those of the aromatic vinyl-conjugated diene rubber A described above.

The content of the aromatic vinyl-conjugated diene rubber b1 in the diene rubber is preferably from 20 to 40% by mass, and more preferably from 25 to 35% by mass, from the perspective of achieving the superior effect of the present invention.

Butadiene Rubber b2

The butadiene rubber b2 is a butadiene rubber (BR) having a weight average molecular weight (Mw) of 15000 or greater.

In the present specification, the weight average molecular weight (Mw) and a number average molecular weight (Mn) are measured by gel permeation chromatography (GPC) in terms of a polystyrene standard.

Solvent: Tetrahydrofuran
Detector: RI detector

From the perspective of achieving the superior effect of the present invention, the vinyl unit content of the butadiene rubber b2 is preferably from 0.1 to 15% by mole.

Note that, the vinyl unit content of the butadiene rubber refers to the proportion (% by mole) occupied by a repeating unit having a vinyl structure (for example, 1,2-vinyl structure in a case where the conjugated diene is 1,3-butadiene) among all the repeating units derived from the butadiene in the butadiene rubber.

The content of the butadiene rubber b2 in the diene rubber is preferably from 20 to 40% by mass, and more preferably from 25 to 35% by mass, from the perspective of achieving the superior effect of the present invention.

Content

The content of the rubber component B in the diene rubber is from 10 to 70% by mass.

In a case where the composition according to an embodiment of the present invention is the first preferable aspect described above, the content of the rubber component B in the diene rubber is preferably 40% by mass or less, and more preferably 30% by mass or less, from the perspective of achieving the superior effect of the present invention.

In addition, in a case where the composition according to an embodiment of the present invention is the second preferable aspect described above, the content of the rubber component B in the diene rubber is preferably from 60 to 70% by mass, from the perspective of achieving the superior effect of the present invention.

Other Diene Rubber

The diene rubber contained in the composition according to an embodiment of the present invention may further contain a diene rubber (other diene rubbers) that does not correspond to any of the aromatic vinyl-conjugated diene rubber A and the rubber component B described above. Examples of such a diene rubber include natural rubber (NR), isoprene rubber (IR), acrylonitrile-butadiene copolymer rubber (NBR), butyl rubber (IIR), butyl halide rubber (Br-IIR, Cl-IIR), and chloroprene rubber (CR).

The content of other diene rubbers in the diene rubbers is not particularly limited, and is preferably from 0 to 30% by mass from the perspective of achieving the superior effect of the present invention.

Average Glass Transition Temperature

An average glass transition temperature (average Tg) of the diene rubber contained in the composition according to an embodiment of the present invention is lower than −20° C.

In a case where the composition according to an embodiment of the present invention is the first preferable aspect described above, the average Tg of the above-described diene rubber is preferably from −40 to −30° C., from the perspective of achieving the superior effect of the present invention.

In addition, in a case where the composition according to an embodiment of the present invention is the second preferable aspect described above, the average Tg of the above-described diene rubber is preferably lower than −50° C., from the perspective of achieving the superior effect of the present invention. The lower limit is not particularly limited, but from the perspective of achieving the superior effect of the present invention, it is preferably −100° C. or higher, and more preferably −60° C. or higher.

Note that, the glass transition temperature (Tg) is measured using a differential scanning calorimeter (DSC) at a temperature increase rate of 10° C./min, and is calculated using a midpoint method. When the diene rubber is an oil-extended product, the glass transition temperature is the glass transition temperature of the diene rubber containing no oil-extending component (oil). Furthermore, the average glass transition temperature (Tg) can be determined by multiplying mass fractions of diene rubbers by corresponding glass transition temperatures of the diene rubbers and then summing up the obtained values (weighted average value of the glass transition temperatures), and the sum of the mass fractions of all diene rubbers is set to 1.

Molecular Weight

From the perspective of achieving the superior effect of the present invention, the diene rubber described above preferably has a weight average molecular weight (Mw) from 100000 to 10000000, and more preferably from 300000 to 3000000.

Furthermore, the number average molecular weight (Mn) of the diene rubber contained in the composition according to an embodiment of the present invention is preferably from 50000 to 5000000, and is more preferably from 150000 to 1500000 from the perspective of achieving the superior effect of the present invention.

Note that, the Mw and/or Mn of the at least one diene rubber contained in the diene rubbers is preferably within the range described above, and the Mw and/or Mn of all the diene rubbers contained in the diene rubbers is more preferably within the ranges described above.

Silica

The silica contained in the composition according to an embodiment of the present invention is not particularly limited, and any known silica that is blended into a rubber composition in applications such as a tire can be used.

Examples of the silica include wet silica, dry silica, fumed silica, and diatomaceous earth. One type of the silica may be used alone, or two or more types of the silicas may be used in combination.

CTAB Adsorption Specific Surface Area

A cetyltrimethylammonium bromide (CTAB) adsorption specific surface area of the silica is not particularly limited, and is preferably from 100 to 400 m$^2$/g, more preferably from 150 to 300 m$^2$/g, and still more preferably from 160 to 250 m$^2$/g, from the perspective of achieving the superior effect of the present invention.

Here, the CTAB adsorption specific surface area is a value obtained by measuring the CTAB adsorption amount to the surface of silica in accordance with JIS K6217-3:2001 "Part 3: Method for determining specific surface area—CTAB adsorption method".

Content

In the composition according to an embodiment of the present invention, the content of the silica is from 80 to 200 parts by mass per 100 parts by mass of the above-described diene rubber. Among these, from the perspective of achieving the superior effect of the present invention, it is preferably from 85 to 150 parts by mass.

Specific Modified Butadiene Polymer

As described above, the composition according to an embodiment of the present invention contains a terminal-modified butadiene polymer having a weight average molecular weight from 1000 to 15000, and a molecular weight distribution of 2.0 or less (hereinafter, also referred to as "specific modified butadiene polymer").

Weight Average Molecular Weight

As described above, the weight average molecular weight (Mw) of the specific modified butadiene polymer is from 1000 to 15000. Among these, from the perspective of achieving the superior effect of the present invention, it is preferably 5000 or greater and less than 10000.

Number Average Molecular Weight

The number average molecular weight (Mn) of the specific modified butadiene polymer is not particularly limited as long as the weight average molecular weight and the molecular weight distribution of the specific modified butadiene polymer are within a specific range, but the number average molecular weight (Mn) of the specific modified butadiene polymer is preferably from 1000 to 15000, and more preferably 5000 or greater and less than 10000, from the perspective of achieving the superior effect of the present invention.

Molecular Weight Distribution

As described above, the molecular weight distribution (Mw/Mn) of the specific modified butadiene polymer is 2.0 or less. Among these, from the perspective of achieving the superior effect of the present invention, it is preferably 1.7 or less, more preferably 1.5 or less, and still more preferably 1.3 or less.

The lower limit is not particularly limited, and is generally 1.0 or greater.

Note that, as described above, the methods for measuring Mw and Mn are measured by gel permeation chromatography (GPC) in terms of a polystyrene standard.

Solvent: Tetrahydrofuran

Detector: RI detector

Terminal Modification

As described above, the specific modified butadiene polymer is terminal-modified.

From the perspective of achieving the superior effect of the present invention, the specific modified butadiene polymer preferably has at least one functional group selected from the group consisting of an amino group, a hydroxy group, an epoxy group, an alkylsilyl group, an alkoxysilyl group, a carboxy group, and a specific functional group described below, at a terminal, more preferably has an alkoxysilyl group (particularly, a triethoxysilyl group) or a specific functional group described below, at a terminal, and still more preferably has a specific functional group described below, at a terminal.

Specific Functional Group

As described above, the specific modified butadiene polymer preferably has a functional group (specific functional group) containing a nitrogen atom and a silicon atom at a terminal. Note that, the specific functional group may be provided at at least one terminal.

The specific functional group is not particularly limited as long as it is a functional group containing a nitrogen atom and a silicon atom, and from the perspective of achieving the superior effect of the present invention, the specific functional group preferably contains the nitrogen atom as an amino group (—NR$_2$: R is a hydrogen atom or a hydrocarbon group), and preferably contains the silicon atom as a hydrocarbyloxysilyl group (≡SiOR: R is a hydrocarbon group).

From the perspective of achieving superior effect of the present invention, the specific functional group is preferably a group represented by Formula (M) below.

[Chemical Formula 1]

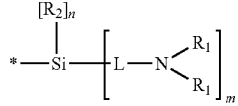
(M)

In Formula (M) above, R$_1$ and R$_2$ each independently represent a hydrogen atom or a substituent.

In Formula (M) above, L represents a divalent organic group.

The substituent is not particularly limited as long as the substituent is a monovalent substituent, and examples thereof include hydrocarbon groups that may have a halogen atom, hydroxy group, nitro group, carboxy group, alkoxy group, amino group, mercapto group, acyl group, imide group, phosphino group, phosphinyl group, silyl group, or hetero atom.

Examples of the halogen atom include a fluorine atom, chlorine atom, bromine atom, and iodine atom.

Examples of the hetero atom of the hydrocarbon group that may have a hetero atom include an oxygen atom, nitrogen atom, sulfur atom, and phosphorous atom.

Examples of the hydrocarbon group that may have a hetero atom include aliphatic hydrocarbon groups, aromatic hydrocarbon groups, and groups that have a combination of these.

The aliphatic hydrocarbon group may be in a form of straight-chain, branched-chain, or ring. Specific examples of the aliphatic hydrocarbon group include straight-chain or branched alkyl groups (especially, those having from 1 to 30 carbon atoms), straight-chain or branched alkenyl groups (especially, those having from 2 to 30 carbon atoms), and straight-chain or branched alkynyl groups (especially, those having from 2 to 30 carbon atoms).

Examples of the aromatic hydrocarbon group include aromatic hydrocarbon groups having from 6 to 18 carbon atoms such as a phenyl group, a tolyl group, a xylyl group, and a naphthyl group.

In Formula (M) above, $R_1$ is preferably a hydrogen atom, an alkyl group (preferably from 1 to 10 carbon atoms), an alkylsilyl group (preferably from 1 to 10 carbon atoms), and an aromatic hydrocarbon group (preferably, from 6 to 18 carbon atoms), and more preferably a hydrogen atom, from the perspective of achieving the superior effect of the present invention.

Note that, a plurality of $R_1$ moieties may be the same or different.

The $R_2$ is preferably a hydrocarbyloxy group (—OR group: R is a hydrocarbon group), and is more preferably an alkoxy group (preferably from 1 to 10 carbon atoms) from the perspective of achieving the superior effect of the present invention.

As described above, in Formula (M) above, L represents a single bond or a divalent organic group.

Examples of the divalent organic group include an aliphatic hydrocarbon group (such as an alkylene group, preferably having from 1 to 10 carbon atoms), an aromatic hydrocarbon group (such as an arylene group, preferably having from 6 to 18 carbon atoms), —O—, —S—, —$SO_2$—, (R: alkyl group), —CO—, —NH—, —COO—, —CONH—, or groups that have a combination of these (such as an alkyleneoxy group (—$C_mH_{2m}O$—: m is a positive integer), an alkyleneoxycarbonyl group, and an alkylenecarbonyloxy group).

From the perspective of achieving the superior effect of the present invention, L is preferably an alkylene group (preferably having from 1 to 10 carbon atoms).

In Formula (M) above, n represents an integer from 0 to 2.

From the perspective of achieving superior effect of the present invention, n is preferably 2.

In Formula (M) above, m represents an integer from 1 to 3.

From the perspective of achieving the superior effect of the present invention, m is preferably 1.

In Formula (M) above, n and m satisfy the relationship n+m=3.

In Formula (M) above, * represents a bond position.

Micro Structure

Vinyl Structure

In the specific modified butadiene polymer, the proportion of a vinyl structure (vinyl unit content) is not particularly limited, and is preferably from 10 to 50% by mole, and more preferably from 20 to 40% by mole, from the perspective of achieving the superior effect of the present invention.

Here, the proportion of the vinyl structure refers to the proportion (% by mole) occupied by a repeating unit having a vinyl structure among the repeating units derived from butadiene.

1,4-Trans Structure

In the specific modified butadiene polymer, the proportion of a 1,4-trans structure is not particularly limited, and is preferably from 10 to 70% by mole, and more preferably from 30 to 50% by mole, from the perspective of achieving the superior effect of the present invention.

Here, the proportion of the 1,4-trans structure refers to the proportion (% by mole) occupied by a repeating unit having a 1,4-trans structure among the repeating units derived from butadiene.

1,4-Cis Structure

In the specific modified butadiene polymer, the proportion of a 1,4-cis structure is not particularly limited, and is preferably from 10 to 50% by mole, and more preferably from 20 to 40% by mole, from the perspective of achieving the superior effect of the present invention.

Here, the proportion of the 1,4-cis structure refers to the proportion (% by mole) occupied by a repeating unit having a 1,4-cis structure among the repeating units derived from butadiene.

Note that hereinafter, "the proportion (% by mole) of the vinyl structure, the proportion (% by mole) of the 1,4-trans structure, and the proportion (% by mole) of the 1,4-cis structure" are also represented as "vinyl/trans/cis".

Glass Transition Temperature

A glass transition temperature (Tg) of the specific modified butadiene polymer is not particularly limited, and from the perspective of achieving the superior effect of the present invention, it is preferably −100 to −60° C., and more preferably −90 to −70° C., and further preferably −85 to −75° C.

Note that, the glass transition temperature (Tg) is measured using a differential scanning calorimeter (DSC) at a temperature increase rate of 10° C./min, and is calculated using a midpoint method.

Viscosity

A viscosity of the specific modified butadiene polymer is not particularly limited, and is preferably from 1000 to 10000 pa·s, and more preferably from 3000 to 6000 pa·s, from the perspective of achieving the superior effect of the present invention.

In addition, the viscosity of the butadiene polymer before modifying the specific modified butadiene polymer is not particularly limited, and is preferably from 500 to 5000 mPa·s, and more preferably 1500 to 3000 mPa·s, from the perspective of achieving the superior effect of the present invention.

Additionally, the viscosity of the specific modified butadiene polymer is preferably from 150 to 240% with respect to the viscosity of the butadiene polymer before modification from the perspective of achieving the superior effect of the present invention. Hereinafter, the viscosity of the specific modified butadiene polymer after modification to that of the specific modified butadiene polymer before modification is also referred to as "viscosity (after modification/before modification)".

Note that, the viscosity is measured using a cone plate viscometer in accordance with JIS K5600-2-3.

Method for Producing Specific Modified Butadiene Polymer

The method for producing the specific modified butadiene polymer is not particularly limited, and known methods can be used. A method for a specific range of molecular weight and molecular weight distribution is not particularly limited, and examples thereof include a method of adjusting a ratio between an amount of an initiator, a monomer, and a stop agent, a reaction temperature, and a rate at which the initiator is added.

The method for producing the specific modified butadiene polymer is preferably a method for polymerizing butadiene using an organolithium compound and then stopping polymerization using an electrophile containing a nitrogen atom and a silicon atom (hereinafter, also referred to as "method according to an embodiment of the present invention"), from the perspective of achieving the superior effect of the present invention for a composition to be obtained. Hereinafter, "achieving the superior effect of the present invention for a composition to be obtained" is also simply referred to as "achieving the superior effect of the present invention".

Organolithium Compound

The organolithium compound is not particularly limited, and specific examples thereof include mono-organolithium compounds such as n-butyllithium, sec-butyllithium, tert-butyllithium, n-propyllithium, iso-propyllithium, and benzyllithium; and polyfunctional organolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene. Among these, from the perspective of achieving the superior effect of the present invention, a mono-organolithium compound such as n-butyl lithium, sec-butyl lithium, and tert-butyl lithium is preferable.

The amount of the organolithium compound used is not particularly limited, and is preferably from 0.001 to 10% by mole with respect to butadiene, from the perspective of achieving the superior effect of the present invention.

Copolymerization of Butadiene

The method for polymerizing butadiene using an organolithium compound is not particularly limited, and examples thereof include a method in which the organolithium compound described above is added to an organic solvent solution containing butadiene and stirred at a temperature range of from 0 to 120° C. (preferably 30 to 100° C.).

Specific Electrophile

In the method according to an embodiment of the present invention, the polymerization of butadiene is stopped using an electrophile containing a nitrogen atom and a silicon atom (hereinafter also referred to as "specific electrophile"). The polymerization is stopped using a specific electrophile to obtain a modified butadiene polymer having the above-described specific functional groups at a terminal.

The specific electrophile is not particularly limited as long as it is a compound containing a nitrogen atom and a silicon atom, and from the perspective of achieving the superior effect of the present invention, the specific electrophile preferably contains the nitrogen atom as an amino group (—$NR_2$: R is a hydrogen atom or a hydrocarbon group), and preferably contains the silicon atom as a hydrocarbyloxysilyl group (≡SiOR: R is a hydrocarbon group).

From the perspective of achieving the superior effect of the present invention, the specific electrophile is preferably silazane, and is more preferably cyclic silazane. Here, "silazane" refers to a compound (a compound having a Si—N bond) having a structure in which a silicon atom and a nitrogen atom are directly bonded to each other.

From the perspective of achieving the superior effect of the present invention, the cyclic silazane is preferably a compound represented by Formula (S) below.

[Chemical Formula 2]

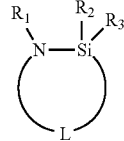

(S)

In Formula (S) above, $R_1$ to $R_3$ each independently represent a hydrogen atom or a substituent. Specific examples and preferable aspects of the substituent are the same as those of $R_1$ and $R_2$ in Formula (M) described above.

In Formula (S) above, L represents a divalent organic group. Specific examples and preferable aspects of the divalent organic group are the same as those of L in Formula (M) described above.

In Formula (S) above, $R_1$ is preferably an alkyl group (preferably 1 to 10 carbon atoms), an alkylsilyl group (preferably from 1 to 10 carbon atoms), and an aromatic hydrocarbon group (preferably, from 6 to 18 carbon atoms), and more preferably an alkylsilyl, from the perspective of achieving the superior effect of the present invention.

In Formula (S) above, $R_2$ and $R_3$ are each independently preferably a hydrocarbyloxy group (—OR group: R is a hydrocarbon group), and is more preferably an alkoxy group (preferably from 1 to 10 carbon atoms) from the perspective of achieving the superior effect of the present invention.

In Formula (S) above, L is preferably an alkylene group (preferably having from 1 to 10 carbon atoms, more preferably having from 2 to 8 carbon atoms, and still more preferably having from 3 to 5 carbon atoms), from the perspective of achieving the superior effect of the present invention.

Examples of the compound represented by Formula (S) above include N-n-butyl-1,1-dimethoxy-2-azasilacyclopentane, N-phenyl-1,1-dimethoxy-2-azasilacyclopentane, N-trimethylsilyl-1,1-dimethoxy-2-azasilacyclopentane, and N-trimethylsilyl-1,1-diethoxy-2-azasilacyclopentane.

Note that, the silicon atoms of the cyclic silazane are considered to exhibit electrophilicity.

The amount of the specific electrophile with respect to the organolithium compound is not particularly limited, and from the perspective of achieving the superior effect of the present invention, it is preferably from 0.1 to 10, and more preferably from 1 to 5 at a molar ratio.

Content

In the composition according to an embodiment of the present invention, the content of the specific modified butadiene polymer is from 1.0 to 25.0% by mass with respect to the content of the silica described above. Hereinafter, the content of the specific modified butadiene polymer with respect to the content of the silica is also referred to as "specific modified butadiene polymer/silica".

The specific modified butadiene polymer/silica is preferably from 2.0 to 20.0% by mass, more preferably from 3.0 to 10.0% by mass, and still more preferably from 4.0 to 7.0% by mass, from the perspective of achieving the superior effect of the present invention.

In addition, the content of the specific modified butadiene polymer is preferably from 1 to 20 parts by mass, and more preferably from 2 to 10 parts by mass, per 100 parts by mass of the diene rubber, from the perspective of achieving the superior effect of the present invention.

Optional Component

The composition according to an embodiment of the present invention may further contain another component (optional component) as necessary.

Examples of such a component include various additives that are typically used in rubber compositions, such as fillers (such as carbon black) other than silica, silane coupling agents, terpene resins (preferably, aromatic modified terpene resins), heat-expandable microcapsules, zinc oxide (zinc white), stearic acid, antioxidants, wax, processing aids, process oils, liquid polymers, thermosetting resins, vulcanizing agents (such as sulfur), and vulcanization accelerator.

Silane Coupling Agent

The composition according to an embodiment of the present invention preferably contains a silane coupling agent from the perspective of achieving the superior effect of the present invention. The silane coupling agent is not particularly limited as long as it is a silane compound having a hydrolyzable group and an organic functional group.

The hydrolyzable group is not particularly limited; however, examples thereof include an alkoxy group, a phenoxy group, a carboxyl group, and an alkenyloxy group. Among these, from the perspective of achieving the superior effect of the present invention, the hydrolyzable group is preferably an alkoxy group. When the hydrolyzable group is an alkoxy group, the number of carbon atoms of the alkoxy group is preferably from 1 to 16, and more preferably from 1 to 4, from the perspective of achieving the superior effect of the present invention. Examples of the alkoxy group having from 1 to 4 carbon atoms include a methoxy group, ethoxy group, and propoxy group.

The organic functional group is not particularly limited, and is preferably a group capable of forming a chemical bond with an organic compound. Examples thereof include an epoxy group, a vinyl group, an acryloyl group, a methacryloyl group, an amino group, a sulfide group, a mercapto group, and a block mercapto group (a protected mercapto group) (for example, an octanoylthio group). Among these, from the perspective of achieving the superior effect of the present invention, a sulfide group (particularly, a disulfide group and a tetrasulfide group), a mercapto group, and a block mercapto group are preferable.

The silane coupling agent may be used alone, or two or more types of these may be used in a combination.

The silane coupling agent is preferably a sulfur-containing silane coupling agent from the perspective of achieving the superior effect of the present invention.

Specific examples of the silane coupling agent include bis(3-triethoxysilyl-propyl)tetrasulfide, bis(3-trimethoxysilyl-propyl)tetrasulfide, bis(3-triethoxysilyl-propyl)disulfide, mercaptopropyl-trimethoxysilane, mercaptopropyl-triethoxysilane, 3-trimethoxysilylpropyl-N,N-dimethylthiocarbamoyl-tetrasulfide, trimethoxysilylpropyl-mercaptobenzothiazole tetrasulfide, triethoxysilylpropyl-methacrylate-monosulfide, dimethoxymethylsilylpropyl-N,N-dimethylthiocarbamoyl-tetrasulfide, and 3-octanoylthio-1-propyltriethoxysilane. One of these may be used alone, or two or more types of these may be used in a combination.

From the perspective of achieving the superior effect of the present invention, the silane coupling agent is preferably a compound represented by the following Formula (S).

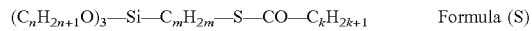

$$(C_nH_{2n+1}O)_3-Si-C_mH_{2m}-S-CO-C_kH_{2k+1} \quad \text{Formula (S)}$$

In Formula (S), n represents an integer from 1 to 3, m represents an integer from 1 to 5 (preferably an integer from 2 to 4), and k represents an integer from 1 to 15 (preferably an integer from 5 to 10).

In the composition according to an embodiment of the present invention, the content of the silane coupling agent is not particularly limited, and is preferably from 1 to 20% by mass, and more preferably from 5 to 15% by mass, with respect to the amount of the silica described above, from the perspective of achieving the superior effect of the present invention.

In addition, the content of the silane coupling agent is preferably from 1 to 20 parts by mass, and more preferably from 2 to 10 parts by mass, per 100 parts by mass of the diene rubber, from the perspective of achieving superior effect of the present invention.

Carbon Black

The composition according to an embodiment of the present invention preferably contains carbon black, from the perspective of achieving the superior effect of the present invention. As the carbon black, one type of carbon black may be used alone, or two or more types of carbon black may be used in combination.

The carbon black is not particularly limited and, for example, carbon blacks of various grades, such as SAF-HS, SAF, ISAF-HS, ISAF, ISAF-LS, IISAF-HS, HAF-HS, HAF, HAF-LS, FEF, GPF, and SRF can be used.

A nitrogen adsorption specific surface area ($N_2SA$) of the carbon black is not particularly limited, and is preferably from 50 to 200 m²/g, and more preferably from 70 to 150 m²/g, from the perspective of achieving the superior effect of the present invention.

Note that the nitrogen adsorption specific surface area ($N_2SA$) is a value of the amount of nitrogen adsorbed to the surface of carbon black, measured in accordance with JIS K6217-2:2001 "Part 2: Determination of specific surface area—Nitrogen adsorption methods—Single-point procedures".

In the composition according to an embodiment of the present invention, the content of the carbon black is not particularly limited, and is preferably from 1 to 100 parts by mass, and more preferably from 2 to 10 parts by mass with respect to 100 parts by mass of the above-described diene rubber, from the perspective of achieving the superior effect of the present invention.

Method for Preparing Rubber Composition for a Tire

The method of producing the composition according to an embodiment of the present invention is not particularly limited, and specific examples thereof include a method whereby each of the above-mentioned components is kneaded using a publicly known method and device (e.g. Banbury mixer, kneader, and roll). When the composition according to an embodiment of the present invention contains a sulfur or a vulcanization accelerator, the components other than the sulfur and the vulcanization accelerator are preferably mixed first at a high temperature (preferably from 100 to 160° C.) and then cooled before the sulfur or the vulcanization accelerator is mixed.

In addition, the composition according to an embodiment of the present invention can be vulcanized or crosslinked under known vulcanizing or crosslinking conditions.

The rubber composition according to an embodiment of the present invention is useful for a tire (particularly a tire tread).

Also, as described above, in a case where the composition of an embodiment of the present invention is the first preferable aspect, it is particularly useful as a summer tire. Also, as described above, in a case where the composition of an embodiment of the present invention is the second preferable aspect, it is particularly useful as a winter tire.

Pneumatic Tire

The pneumatic tire according to an embodiment of the present invention is a pneumatic tire produced using the composition according to an embodiment of the present invention described above. In particular, a pneumatic tire that uses the composition according to an embodiment of the present invention in a tire tread (cap tread) is preferable.

FIG. 1 is a partial cross-sectional schematic view of a pneumatic tire that represents the pneumatic tire according to an embodiment of the present invention, but the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire circumference of the tire on the outer side of the carcass layer 4.

Additionally, rim cushions 8 are provided in portions of the bead portions 1 that are in contact with a rim.

Note that the tire tread portion 3 is formed of the composition according to an embodiment of the present invention described above.

The pneumatic tire according to an embodiment of the present invention can be produced, for example, in accordance with a known method. In addition, as a gas with which the pneumatic tire is filled, an inert gas such as nitrogen, argon, helium, or the like can be used in addition to a normal air or air whose oxygen partial pressure is adjusted.

Example

The present invention is described in further detail below by using examples. However, the present invention is not limited to these examples.

Production of Specific Modified Butadiene Polymer 1 n-BuLi (n-butyllithium) (available from Kanto Chemical Co., Inc.: 1.60 mol/L (hexane solution), 27 mL, 43.2 mmol) was added to a mixed solution of 1,3-butadiene (205 g, 3786 mmol) and 2,2-di(2-tetrahydrofuryl) propane (available from Tokyo Chemical Industry Co., Ltd., 0.1 mL, 0.55 mmol) in cyclohexane (2.96 kg), and the mixture was stirred at room temperature for 6 hours. After the reaction, N-trimethylsilyl-1,1-dimethoxy-2-azasilacyclopentane (structure below) (15 g, 137 mmol) was added to stop the polymerization.

[Chemical Formula 3]

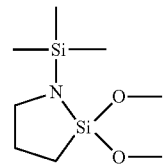

The obtained solution was collected and concentrated under reduced pressure. The concentrated solution was poured into methanol (10 L) to separate a methanol insoluble component. As a result, a modified butadiene polymer (specific modified butadiene polymer 1) (199 g, Mn=7,600, Mw=8,100, Mw/Mn=1.1) having a functional group represented by Formula (m1) below (here, *represents a bonding position) at a terminal was obtained at 97% of yield. Note that, cis/trans/vinyl was estimated to be 24/40/36 by IR analysis. Additionally, Tg was −80° C. The viscosity (after modification/before modification) was 204%.

[Chemical Formula 4]

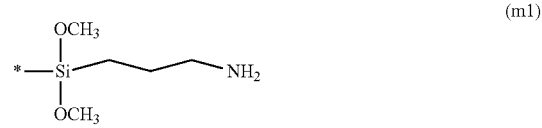

(m1)

Production of Rubber Composition for a Tire (Tables 1 to 3)

The components shown in Tables 1 to 3 below were blended in the proportions (part by mass) shown in the same tables. Specifically, mixing was performed using a Banbury mixer at 150° C. for 2 minutes. Thereafter, a roll was used to mix the sulfur and the vulcanization accelerator to obtain a rubber composition for a tire.

Note that, in Tables 1 to 3, for the amount of the aromatic vinyl-conjugated diene rubber A, a value of an upper row is the amount (unit: parts by mass) of the aromatic vinyl-conjugated diene-based rubber A (oil-extended product), and a value of a lower row is the net amount (unit: parts by mass) of SBR contained in the aromatic vinyl-conjugated diene rubber A.

Evaluation

The obtained rubber composition for a tire was evaluated as follows.

Workability

The Mooney viscosity of the obtained rubber composition for a tire was measured with a preheating time of 1 minute, a rotor rotation time of 4 minutes, and a test temperature of 100° C. using an L-shaped rotor in accordance with JIS K6300-1:2013.

The results are shown in Tables 1 to 3. The results are expressed as index values with Standard Example 1-1 being assigned the index value of 100 in Table 1, with Standard Example 2-1 being assigned the index value of 100 in Table 2, and with Standard Example 3-1 being assigned the index value of 100 in Table 3. A smaller index indicates lower viscosity and better workability. Practically, the evaluation result is preferably 99 or lower.

Silica Dispersibility

The obtained rubber composition for a tire (unvulcanized) was vulcanized at 170° C. for 10 minutes using a strain-shear stress measuring device (RPA2000, available from Alpha Technology Co., Ltd.), then a strain shear modulus G' of 0.56% strain and a strain shear modulus G' of 100% strain were measured, and the difference ΔG'=G'(0.56%)−G' (100%) was calculated as a Payne effect.

The results are shown in Tables 1 to 3. The results are expressed as index values with Standard Example 1-1 being assigned the index value of 100 in Table 1, with Standard Example 2-1 being assigned the index value of 100 in Table 2, and with Standard Example 3-1 being assigned the index value of 100 in Table 3. The smaller the index, the better the silica dispersibility. Practically, the evaluation result is preferably 84 or lower.

WET Steering Stability

The obtained rubber composition for a tire was placed on a cap tread to produce a pneumatic tire. The obtained pneumatic tires were mounted on a test vehicle, and sensory evaluation was performed by a test driver for the steering stability on wet road surfaces.

The results are shown in Tables 1 to 3. The results are expressed as index values with Standard Example 1-1 being assigned the index value of 100 in Table 1, with Standard Example 2-1 being assigned the index value of 100 in Table 2, and with Standard Example 3-1 being assigned the index value of 100 in Table 3. The larger the index, the better the WET performance (WET steering stability). Practically, the evaluation result is preferably 95 or higher.

Fuel Efficiency

The obtained rubber composition for a tire was vulcanized in a predetermined mold at 160° C. for 20 minutes to fabricate a vulcanized rubber test sample. The value of tan δ (60° C.) was measured for the obtained vulcanized rubber test sample with an elongation deformation distortion of 10%±2%, an oscillation frequency of 20 Hz, and a temperature of 60° C. using a viscoelastic spectrometer (available from Toyo Seiki Seisaku-sho, Ltd.) in accordance with JIS K6394:2007.

The results are shown in Tables 1 to 3. The results are expressed as index values with Standard Example 1-1 being assigned the index value of 100 in Table 1, with Standard Example 2-1 being assigned the index value of 100 in Table 2, and with Standard Example 3-1 being assigned the index value of 100 in Table 3. Smaller index values indicate smaller tan δ (60° C.) values, which in turn indicate excellent low rolling resistance when used in a pneumatic tire. Practically, the evaluation result is preferably 98 or lower, and more preferably 95 or lower.

Durability During High-Speed Running (High-Speed Durability)

A pneumatic tire was manufactured using the obtained rubber composition for a tire (Table 3 only) in a tire tread. Then, the durability during high-speed running (traveling distance when failure occurred) was evaluated for the obtained pneumatic tire in accordance with JIS D4230 high-speed performance test B.

The results are shown in Table 3. The results are expressed as index values with Standard Example 3-1 being assigned the index value of 100. The larger the index, the better durability during high-speed running (high-speed durability).

TABLE 1

| Table 1 | Standard Example 1-1 | Example 1-1 | Example 1-2 | Example 1-3 | Comparative Example 1-1 | Comparative Example 1-2 | Comparative Example 1-3 | Comparative Example 1-4 | Comparative Example 1-5 |
|---|---|---|---|---|---|---|---|---|---|
| Aromatic vinyl-conjugated diene rubber (A) | 110 (80) | 110 (80) | 110 (80) | 68.75 (50) | 110 (80) | 110 (80) | 110 (80) | 110 (80) | 110 (80) |
| Butadiene rubber b2 | 20 | 20 | 20 | 50 | 20 | 20 | 20 | 20 | 20 |
| Silica 1 | 90 | 90 | 90 | 90 | 90 | 90 | 90 | 50 | 220 |
| Silane coupling agent 1 | 7.2 | 7.2 | 7.2 | 7.2 | 7.2 | 7.2 | 7.2 | 7.2 | 7.2 |
| Carbon black | 5 | 5 | 5 | 5 | 5 | 5 | 5 | 5 | 5 |
| Process oil | 15 | 15 | 15 | 15 | 15 | 15 | 15 | 15 | 15 |
| Anti-aging agent | 1 | 1 | 1 | 1 | 1 | 1 | 1 | 1 | 1 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Specific Modified Butadiene Polymer 1 | | 4 | | 4 | | 0.5 | 25 | 4 | 4 |
| Specific modified butadiene polymer 2 | | | 4 | | | | | | |
| Unmodified modified butadiene polymer | | | | | 4 | | | | |

TABLE 1-continued

| Table 1 | Standard Example 1-1 | Example 1-1 | Example 1-2 | Example 1-3 | Comparative Example 1-1 | Comparative Example 1-2 | Comparative Example 1-3 | Comparative Example 1-4 | Comparative Example 1-5 |
|---|---|---|---|---|---|---|---|---|---|
| Vulcanization accelerator (DPG) | 1.5 | 1.5 | 1.5 | 1.5 | 1.5 | 1.5 | 1.5 | 1.5 | 1.5 |
| Vulcanization accelerator (CZ) | 2 | 2 | 2 | 2 | 2 | 2 | 2 | 2 | 2 |
| Sulfur | 2 | 2 | 2 | 2 | 2 | 2 | 2 | 2 | 2 |
| Average Tg of diene rubber [° C.] | −39 | −39 | −39 | −67 | −39 | −39 | −39 | −39 | −39 |
| Specific modified butadiene polymer/silica (% by mass) | 0.0% | 4.4% | 4.4% | 4.4% | 0.0% | 0.6% | 27.8% | 8.0% | 1.8% |
| Workability | 100 | 97 | 99 | 97 | 94 | 100 | 88 | 90 | 104 |
| Silica dispersibility | 100 | 75 | 82 | 80 | 86 | 96 | 62 | 79 | 85 |
| Wet steering stability | 100 | 101 | 102 | 95 | 97 | 100 | 86 | 90 | 112 |
| Fuel Efficiency | 100 | 91 | 93 | 97 | 96 | 99 | 99 | 95 | 110 |

TABLE 2

| Table 2 | Standard Example 2-1 | Example 2-1 | Example 2-2 | Example 2-3 | Comparative Example 2-1 | Comparative Example 2-2 | Comparative Example 2-3 | Comparative Example 2-4 | Comparative Example 2-5 |
|---|---|---|---|---|---|---|---|---|---|
| Aromatic vinyl-conjugated diene rubber (A) | 110 (80) | 110 (80) | 110 (80) | 68.75 (50) | 110 (80) | 110 (80) | 110 (80) | 110 (80) | 110 (80) |
| Butadiene rubber b2 | 20 | 20 | 20 | 50 | 20 | 20 | 20 | 20 | 20 |
| Silica 2 | 90 | 90 | 90 | 90 | 90 | 90 | 90 | 50 | 220 |
| Silane coupling agent 2 | 9 | 9 | 9 | 9 | 9 | 9 | 9 | 9 | 9 |
| Carbon black | 5 | 5 | 5 | 5 | 5 | 5 | 5 | 5 | 5 |
| Process oil | 15 | 15 | 15 | 15 | 15 | 15 | 15 | 15 | 15 |
| Anti-aging agent | 1 | 1 | 1 | 1 | 1 | 1 | 1 | 1 | 1 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Specific Modified Butadiene Polymer 1 | | 4 | | 4 | | 0.5 | 25 | 4 | 4 |
| Specific modified butadiene polymer 2 | | | 4 | | | | | | |
| Unmodified modified butadiene polymer | | | | | 4 | | | | |
| Vulcanization accelerator (DPG) | 1.5 | 1.5 | 1.5 | 1.5 | 1.5 | 1.5 | 1.5 | 1.5 | 1.5 |
| Vulcanization accelerator (CZ) | 2 | 2 | 2 | 2 | 2 | 2 | 2 | 2 | 2 |
| Sulfur | 2 | 2 | 2 | 2 | 2 | 2 | 2 | 2 | 2 |
| Average Tg of diene rubber [° C.] | −39 | −39 | −39 | −67 | −39 | −39 | −39 | −39 | −39 |
| Specific modified butadiene polymer/silica (% by mass) | 0.0% | 4.4% | 4.4% | 4.4% | 0.0% | 0.6% | 27.8% | 8.0% | 1.8% |
| Workability | 100 | 95 | 96 | 97 | 94 | 100 | 90 | 89 | 105 |
| Silica dispersibility | 100 | 74 | 81 | 80 | 90 | 97 | 68 | 80 | 91 |
| Wet steering stability | 100 | 102 | 103 | 95 | 97 | 100 | 84 | 88 | 113 |
| Fuel Efficiency | 100 | 90 | 91 | 98 | 98 | 99 | 99 | 95 | 110 |

TABLE 3

| Table 3 | Standard Example 3-1 | Example 3-1 | Example 3-2 | Example 3-3 | Comparative Example 3-1 | Comparative Example 3-2 | Comparative Example 3-3 | Comparative Example 3-4 | Comparative Example 3-5 |
|---|---|---|---|---|---|---|---|---|---|
| Aromatic vinyl-conjugated diene rubber (A) | 96.25 (70) | 96.25 (70) | 96.25 (70) | 68.75 (50) | 96.25 (70) | 96.25 (70) | 96.25 (70) | 96.25 (70) | 96.25 (70) |
| Butadiene rubber b2 | 10 | 10 | 10 | 30 | 10 | 10 | 10 | 10 | 10 |
| Natural rubber | 20 | 20 | 20 | 20 | 20 | 20 | 20 | 20 | 20 |
| Silica 1 | 90 | 90 | 90 | 90 | 90 | 90 | 90 | 50 | 220 |
| Silane coupling agent 1 | 7.2 | 7.2 | 7.2 | 7.2 | 7.2 | 7.2 | 7.2 | 7.2 | 7.2 |
| Carbon black | 5 | 5 | 5 | 5 | 5 | 5 | 5 | 5 | 5 |
| Process oil | 15 | 15 | 15 | 15 | 15 | 15 | 15 | 15 | 15 |
| Anti-aging agent | 1 | 1 | 1 | 1 | 1 | 1 | 1 | 1 | 1 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Specific Modified Butadiene Polymer 1 | | 4 | | 4 | | 0.5 | 25 | 4 | 4 |
| Specific modified butadiene polymer 2 | | | 4 | | | | | | |

TABLE 3-continued

| Table 3 | Standard Example 3-1 | Example 3-1 | Example 3-2 | Example 3-3 | Comparative Example 3-1 | Comparative Example 3-2 | Comparative Example 3-3 | Comparative Example 3-4 | Comparative Example 3-5 |
|---|---|---|---|---|---|---|---|---|---|
| Unmodified modified butadiene polymer | | | | | 4 | | | | |
| Vulcanization accelerator (DPG) | 1.5 | 1.5 | 1.5 | 1.5 | 1.5 | 1.5 | 1.5 | 1.5 | 1.5 |
| Vulcanization accelerator (CZ) | 2 | 2 | 2 | 2 | 2 | 2 | 2 | 2 | 2 |
| Sulfur | 2 | 2 | 2 | 2 | 2 | 2 | 2 | 2 | 2 |
| Average Tg of diene rubber [° C.] | −43 | −43 | −43 | −59 | −43 | −43 | −43 | −43 | −43 |
| Specific modified butadiene polymer/silica (% by mass) | 0.0% | 4.4% | 4.4% | 4.4% | 0.0% | 0.6% | 27.8% | 8.0% | 1.8% |
| Workability | 100 | 97 | 99 | 97 | 94 | 100 | 88 | 90 | 104 |
| Silica dispersibility | 100 | 75 | 82 | 80 | 88 | 96 | 62 | 79 | 85 |
| Wet steering stability | 100 | 102 | 101 | 95 | 97 | 100 | 88 | 90 | 112 |
| Fuel Efficiency | 100 | 89 | 91 | 98 | 98 | 99 | 99 | 95 | 110 |
| Durability During High-Speed Running | 100 | 102 | 101 | 98 | 96 | 100 | 97 | 95 | 110 |

The details of each component shown in the above Tables 1 to 3 are as follows.

Note that the aromatic vinyl-conjugated diene rubber A is a terminal-modified aromatic vinyl-conjugated diene rubber having an aromatic vinyl content from 35 to 45% by mass and a vinyl unit content from 25 to 45% by mole, and thus the aromatic vinyl-conjugated diene rubber A corresponds to the "aromatic vinyl-conjugated diene rubber A" described above.

The butadiene rubber b2 is a butadiene rubber having a weight average molecular weight of greater than 15000, and thus corresponds to the above-described "butadiene rubber b2".

Furthermore, the specific modified butadiene polymers 1 and 2 is a terminal-modified butadiene polymer having a weight average molecular weight from 1000 to 15000, and a molecular weight distribution of 2.0 or less, and thus corresponds to the above-described "specific modified butadiene polymer").

Aromatic vinyl-conjugated diene rubber A: E580 (terminal-modified solution-polymerized SBR, aromatic vinyl content (content of repeating units derived from styrene): 35.5% by mass, vinyl unit content: 40% by mole, an oil-extended product having a hydroxy group at a terminal (oil-extended amount: 37.5% by mass, available from Asahi Kasei Corporation)

Butadiene rubber b2: Nipol BR 1220 (BR, Mw: 490000, available from ZEON CORPORATION)

Natural rubber

Silica 1: ZEOSIL 1165MR, (available from Rhodia, CTAB adsorption specific surface area: 155 m$^2$/g)

Silica 2: Ultrasil 9000 GR (available from Evonik, CTAB adsorption specific surface area: 197 m$^2$/g)

Silane coupling agent 1: Si69 (bis [3-(triethoxysilyl) propyl] tetrasulfide

Silane coupling agent 2: NXT silane (available from Momentive Performance Materials, silane coupling agent represented by Formula (S) above (here, in Formula (S) above n=2, m=3, and k=7))

Carbon black: Show Black N339, (available from Cabot Corporation., nitrogen adsorption specific surface area ($N_2SA$)=90 m$^2$/g))

Process oil: Extract No. 4S (available from Showa Shell Sekiyu K.K.)

Anti-aging agent: Santoflex 6PPD (available from Solutia Europe)

Zinc oxide: Zinc Oxide III, (available from Seido Chemical Industry Co., Ltd.)

Stearic acid: Stearic acid YR (available from NOF Corporation)

Specific modified butadiene polymer 1: Specific modified butadiene polymer 1 produced as described above Specific modified butadiene polymer 2: Polyvest EPST60 (Mw: 14,100, Mw/Mn: 1.90, modified butadiene polymer having a triethoxysilyl group at a terminal, available from Evonik)

Unmodified butadiene polymer: Polyvest110 (Mw: 8,200, Mw/Mn: 1.90, terminal unmodification, available from Evonik)

Vulcanization accelerator (DPG): Perkacit DPG (available from Flexsys Chemicals)

Vulcanization accelerator (CZ): NOCCELER CZ-G (available from Ouchi Shinko Chemical Industrial Co., Ltd.)

Sulfur: oil treatment sulfur (available from Karuizawa Refinery Ltd.)

In Tables 1 to 3, "average Tg of diene rubber" refers to the "average glass transition temperature of the diene rubber" described above.

Also in Tables 1 to 3, "specific modified butadiene polymer/silica" refers to the "specific modified butadiene polymer/silica" described above.

As can be seen from Tables 1 to 3, examples in which the specific modified butadiene polymer was blended with silica at a specific quantitative ratio exhibited excellent workability, silica dispersibility, WET performance, and fuel efficiency. From the comparison of Example 1-1 to Example 1-2 (comparison between aspects in which only the type of specific modified butadiene polymer differs), the comparison of Example 2-1 to Example 2-2 (comparison between aspects in which only the type of specific modified butadiene polymer differs), and the comparison of Example 3-1 to Example 3-2 (comparison between aspects in which only the type of specific modified butadiene polymer differs), Example 1-1, Example 2-1, and Example 3-1 in which the specific modified butadiene polymer contains a functional group (specific functional group) containing a nitrogen atom and a silicon atom at a terminal exhibited superior workability, silica dispersibility, and fuel efficiency. Also, from the comparison of Example 3-1 with Example 3-2, Example 3-1 in which the specific modified butadiene polymer contains a functional group (specific functional group) containing a nitrogen atom and a silicon atom at a terminal exhibited superior exhibited excellent high-speed durability.

On the other hand, Standard Example 1-1, Standard Example 2-1, Standard Example 3-1, Comparative Example 1-1, Comparative Example 2-1, and Comparative Example 3-1, Comparative Example 1-2 in which a specific modified butadiene polymer is not contained, Comparative Example 2-2 and Comparative Example 3-2 in which a specific modified butadiene polymer is contained but the specific modified butadiene polymer/silica is less than 1.0% by mass, and Comparative Example 1-3, Comparative Example 2-3, and Comparative Example 3-3 in which a specific modified butadiene polymer is contained but the specific modified butadiene polymer/silica is more than 25.0% by mass exhibited insufficient either workability, silica dispersibility, WET performance, and fuel efficiency.

When Example 1-1 and Example 2-1 were compared to each other, Example 2-1 in which the CTAB adsorption specific surface area of the silica was 160 m²/g or more, and the silane coupling agent was the compound represented by Formula (S) above exhibited superior workability, silica dispersibility, WET performance, and fuel efficiency.

Similarly, when Example 1-2 and Example 2-2 were compared to each other, Example 2-2 in which the CTAB adsorption specific surface area of the silica was 160 m²/g or more, and the silane coupling agent was the compound represented by Formula (S) above exhibited superior workability, silica dispersibility, WET performance, and fuel efficiency.

Production of Rubber Composition for a Tire
(Tables 4 and 5)

The components shown in Tables 4 and 5 below were blended in the proportions (part by mass) shown in Tables 4 and 5 below. Specifically, mixing was performed using a Banbury mixer at 150° C. for 2 minutes. Thereafter, a roll was used to mix the sulfur and the vulcanization accelerator to obtain a rubber composition for a tire.

Note that, in Tables 4 and 5, for the amount of the aromatic vinyl-conjugated diene rubber A, a value of an upper row is the amount (unit: parts by mass) of the aromatic vinyl-conjugated diene-based rubber A (oil-extended product), and a value of a lower row is the net amount (unit: parts by mass) of SBR contained in the aromatic vinyl-conjugated diene rubber A.

Evaluation

The obtained rubber composition for a tire was evaluated as follows.

Workability

The Mooney viscosity of the obtained rubber composition for a tire tread was measured with a preheating time of 1 minute, a rotor rotation time of 4 minutes, and a test temperature of 100° C. using an L-shaped rotor in accordance with JIS K6300-1:2013.

The results are shown in Tables 4 and 5. The results are expressed as index values with Standard Example 1-1 being assigned the index value of 100 in Table 4, and with Standard Example 2-1 being assigned the index value of 100 in Table 5. A smaller index indicates lower the viscosity and better workability. Practically, the evaluation result is preferably 99 or lower.

Silica Dispersibility

The obtained rubber composition for a tire (unvulcanized) was vulcanized at 170° C. for 10 minutes using a strain-shear stress measuring device (RPA2000, available from Alpha Technology Co., Ltd.), then a strain shear modulus G' of 0.56% strain and a strain shear modulus G' of 100% strain were measured, and the difference ΔG'=G'(0.56%)−G' (100%) was calculated as a Payne effect.

The results are shown in Tables 4 and 5. The results are expressed as index values with Standard Example 1-1 being assigned the index value of 100 in Table 4, and with Standard Example 2-1 being assigned the index value of 100 in Table 5. The smaller the index, the better the silica dispersibility. Practically, the evaluation result is preferably 83 or lower.

WET Steering Stability

The obtained rubber composition for a tire was placed on a cap tread to produce a pneumatic tire. The obtained pneumatic tires were mounted on a test vehicle, and sensory evaluation was performed by a test driver for the steering stability on wet road surfaces.

The results are shown in Tables 4 and 5. The results are expressed as index values with Standard Example 1-1 being assigned the index value of 100 in Table 4, and with Standard Example 2-1 being assigned the index value of 100 in Table 5. The larger the index, the better the WET performance (WET steering stability). Practically, the evaluation result is preferably 101 or higher.

Fuel Efficiency

The obtained rubber composition for a tire was vulcanized in a predetermined mold at 160° C. for 20 minutes to fabricate a vulcanized rubber test sample. The value of tan δ (60° C.) was measured for the obtained vulcanized rubber test sample with an elongation deformation distortion of 10%±2%, an oscillation frequency of 20 Hz, and a temperature of 60° C. using a viscoelastic spectrometer (available from Toyo Seiki Seisaku-sho, Ltd.) in accordance with JIS K6394:2007.

The results are shown in Tables 4 and 5. The results are expressed as index values with Standard Example 1-1 being assigned the index value of 100 in Table 4, and with Standard Example 2-1 being assigned the index value of 100 in Table 5. Smaller index values indicate smaller tan δ (60° C.) values, which in turn indicate excellent low rolling resistance when used in a pneumatic tire. Practically, the evaluation result is preferably 103 or lower, and more preferably 95 or lower.

Braking Performance on Snow

The obtained rubber composition for a tire was placed on a cap tread to produce a pneumatic tire. The obtained pneumatic tire was mounted on a test vehicle, and a distance from 40 km/h at an initial speed to the stopping point was measured on a snowy road surface with a temperature of −11° C. and a snow temperature of −9° C., and the reciprocal was determined.

The results are shown in Tables 4 and 5. The results are expressed as index values with Standard Example 1-1 being assigned the index value of 100 in Table 4, and with Standard Example 2-1 being assigned the index value of 100 in Table 5. The larger the index, the shorter distance and the better stability on snow. Practically, the evaluation result is preferably 102 or higher.

TABLE 4

| Table 4 | Standard Example 1-1 | Example 1-1 | Example 1-2 | Example 1-3 | Comparative Example 1-1 | Comparative Example 1-2 | Comparative Example 1-3 | Comparative Example 1-4 | Comparative Example 1-5 |
|---|---|---|---|---|---|---|---|---|---|
| Aromatic vinyl-conjugated diene rubber (A) | 41.25 (30) | 41.25 (30) | 41.25 (30) | 110 (80) | 41.25 (30) | 41.25 (30) | 41.25 (30) | 41.25 (30) | 41.25 (30) |
| Aromatic vinyl-conjugated diene rubber b1 | 35 | 35 | 35 | | 35 | 35 | 35 | 35 | 35 |
| Butadiene rubber b2 | 35 | 35 | 35 | 20 | 35 | 35 | 35 | 35 | 35 |
| Silica 1 | 90 | 90 | 90 | 90 | 90 | 90 | 90 | 50 | 220 |
| Silane coupling agent 1 | 7.2 | 7.2 | 7.2 | 7.2 | 7.2 | 7.2 | 7.2 | 7.2 | 7.2 |
| Carbon black | 5 | 5 | 5 | 5 | 5 | 5 | 5 | 5 | 5 |
| Process oil | 15 | 15 | 15 | 15 | 15 | 15 | 15 | 15 | 15 |
| Anti-aging agent | 1 | 1 | 1 | 1 | 1 | 1 | 1 | 1 | 1 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Specific Modified Butadiene Polymer 1 | | 4 | | 4 | | 0.5 | 25 | 4 | 4 |
| Specific modified butadiene polymer 2 | | | 4 | | | | | | |
| Unmodified modified butadiene polymer | | | | | 4 | | | | |
| Vulcanization accelerator (DPG) | 1.5 | 1.5 | 1.5 | 1.5 | 1.5 | 1.5 | 1.5 | 1.5 | 1.5 |
| Vulcanization accelerator (CZ) | 2 | 2 | 2 | 2 | 2 | 2 | 2 | 2 | 2 |
| Sulfur | 2 | 2 | 2 | 2 | 2 | 2 | 2 | 2 | 2 |
| Average Tg of diene rubber [° C.] | −53 | −53 | −53 | −39 | −53 | −53 | −53 | −53 | −53 |
| Specific modified butadiene polymer/silica (% by mass) | 0.0% | 4.4% | 4.4% | 4.4% | 0.0% | 0.6% | 27.8% | 8.0% | 1.8% |
| Workability | 100 | 94 | 96 | 97 | 99 | 100 | 88 | 90 | 104 |
| Silica dispersibility | 100 | 75 | 81 | 80 | 98 | 101 | 62 | 79 | 84 |
| Wet steering stability | 100 | 105 | 103 | 117 | 98 | 99 | 92 | 90 | 112 |
| Fuel Efficiency | 100 | 91 | 93 | 102 | 99 | 99 | 99 | 92 | 110 |
| Braking performance on snow | 100 | 103 | 102 | 97 | 101 | 99 | 99 | 92 | 102 |

TABLE 5

| Table 5 | Standard Example 2-1 | Example 2-1 | Example 2-2 | Example 2-3 | Comparative Example 2-1 | Comparative Example 2-2 | Comparative Example 2-3 | Comparative Example 2-4 | Comparative Example 2-5 |
|---|---|---|---|---|---|---|---|---|---|
| Aromatic vinyl-conjugated diene rubber (A) | 41.25 (30) | 41.25 (30) | 41.25 (30) | 110 (80) | 41.25 (30) | 41.25 (30) | 41.25 (30) | 41.25 (30) | 41.25 (30) |
| Aromatic vinyl-conjugated diene rubber b1 | 35 | 35 | 35 | | 35 | 35 | 35 | 35 | 35 |
| Butadiene rubber b2 | 35 | 35 | 35 | 20 | 35 | 35 | 35 | 35 | 35 |
| Silica 2 | 90 | 90 | 90 | 90 | 90 | 90 | 90 | 50 | 220 |
| Silane coupling agent 2 | 9 | 9 | 9 | 9 | 9 | 9 | 9 | 9 | 9 |
| Carbon black | 5 | 5 | 5 | 5 | 5 | 5 | 5 | 5 | 5 |
| Process oil | 15 | 15 | 15 | 15 | 15 | 15 | 15 | 15 | 15 |
| Anti-aging agent | 1 | 1 | 1 | 1 | 1 | 1 | 1 | 1 | 1 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Specific Modified Butadiene Polymer 1 | | 4 | | 4 | | 0.5 | 25 | 4 | 4 |
| Specific modified butadiene polymer 2 | | | 4 | | | | | | |
| Unmodified modified butadiene polymer | | | | | 4 | | | | |
| Vulcanization accelerator (DPG) | 1.5 | 1.5 | 1.5 | 1.5 | 1.5 | 1.5 | 1.5 | 1.5 | 1.5 |
| Vulcanization accelerator (CZ) | 2 | 2 | 2 | 2 | 2 | 2 | 2 | 2 | 2 |
| Sulfur | 2 | 2 | 2 | 2 | 2 | 2 | 2 | 2 | 2 |
| Average Tg of diene rubber [° C.] | −53 | −53 | −53 | −39 | −53 | −53 | −53 | −53 | −53 |

TABLE 5-continued

| Table 5 | Standard Example 2-1 | Example 2-1 | Example 2-2 | Example 2-3 | Comparative Example 2-1 | Comparative Example 2-2 | Comparative Example 2-3 | Comparative Example 2-4 | Comparative Example 2-5 |
|---|---|---|---|---|---|---|---|---|---|
| Specific modified butadiene polymer/silica (% by mass) | 0.0% | 4.4% | 4.4% | 4.4% | 0.0% | 0.6% | 27.8% | 8.0% | 1.8% |
| Workability | 100 | 91 | 94 | 96 | 99 | 100 | 87 | 89 | 105 |
| Silica dispersibility | 100 | 74 | 80 | 79 | 98 | 101 | 67 | 77 | 86 |
| Wet steering stability | 100 | 106 | 104 | 118 | 99 | 99 | 92 | 90 | 112 |
| Fuel Efficiency | 100 | 90 | 92 | 103 | 99 | 99 | 99 | 91 | 112 |
| Braking performance on snow | 100 | 105 | 104 | 96 | 101 | 99 | 99 | 93 | 103 |

The details of each component shown in the above Tables 4 and 5 are as follows.

Note that the aromatic vinyl-conjugated diene rubber A is a terminal-modified aromatic vinyl-conjugated diene rubber having an aromatic vinyl content from 35 to 45% by mass and a vinyl unit content from 25 to 45% by mole, and thus the aromatic vinyl-conjugated diene rubber A corresponds to the "aromatic vinyl-conjugated diene rubber A" described above.

Additionally, the aromatic vinyl-conjugated diene rubber b1 is an aromatic vinyl-conjugated diene rubber other than the aromatic vinyl-conjugated diene rubber A as described above because the aromatic vinyl content (content of the repeating unit derived from styrene) is less than 35% by mass, and the vinyl unit content is more than 45% by mole. Thus, the aromatic vinyl-conjugated diene rubber b1 corresponds to the "aromatic vinyl-conjugated diene rubber b1" described above.

The butadiene rubber b2 is a butadiene rubber having a weight average molecular weight of greater than 15000, and thus corresponds to the above-described "butadiene rubber b2".

Furthermore, the specific modified butadiene polymers 1 and 2 is a terminal-modified butadiene polymer having a weight average molecular weight from 1000 to 15000, and a molecular weight distribution of 2.0 or less, and thus corresponds to the above-described "specific modified butadiene polymer").

Aromatic vinyl-conjugated diene rubber A: E580 (terminal-modified solution-polymerized SBR, aromatic vinyl content (content of repeating units derived from styrene): 35.5% by mass, vinyl unit content: 40% by mole, an oil-extended product having a hydroxy group at a terminal (oil-extended amount: 37.5% by mass, available from Asahi Kasei Corporation)

Aromatic vinyl-conjugated diene rubber b1: NS616 (terminal-modified solution-polymerized SBR, aromatic vinyl content (content of repeating units derived from styrene): 21% by mass, vinyl unit content: 63% by mole, having a hydroxy group at a terminal, available from Asahi Kasei Corporation)

Butadiene rubber b2: Nipol BR 1220 (BR, Mw: 490000, available from ZEON CORPORATION)

Silica 1: ZEOSIL 1165MR, (available from Rhodia, CTAB adsorption specific surface area=155 m²/g)

Silica 2: Ultrasil 9000 GR (available from Evonik, CTAB adsorption specific surface area: 197²/g)

Silane coupling agent 1: Si69 (bis [3-(triethoxysilyl) propyl] tetrasulfide

Silane coupling agent 2: NXT silane (available from Momentive Performance Materials, silane coupling agent represented by Formula (S) above (here, in Formula (S) above n=2, m=3, and k=7))

Carbon black: Show Black N339, (available from Cabot Corporation., nitrogen adsorption specific surface area ($N_2SA$)=90 m²/g))

Process oil: Extract No. 4S (available from Showa Shell Sekiyu K.K.)

Anti-aging agent: Santoflex 6PPD (available from Solutia Europe)

Zinc oxide: Zinc Oxide III, (available from Seido Chemical Industry Co., Ltd.)

Stearic acid: Stearic acid YR (available from NOF Corporation)

Specific modified butadiene polymer 1: Specific modified butadiene polymer 1 produced as described above Specific modified butadiene polymer 2: Polyvest EPST60 (Mw: 14,100, Mw/Mn: 1.90, modified butadiene polymer having a triethoxysilyl group at a terminal, available from Evonik)

Unmodified butadiene polymer: Polyvest110 (Mw: 8,200, Mw/Mn: 1.90, terminal unmodification, available from Evonik)

Vulcanization accelerator (DPG): Perkacit DPG (available from Flexsys Chemicals)

Vulcanization accelerator (CZ): NOCCELER CZ-G (available from Ouchi Shinko Chemical Industrial Co., Ltd.)

Sulfur: oil treatment sulfur (available from Karuizawa Refinery Ltd.)

In Tables 4 and 5, "average Tg of diene rubber" refers to the "average glass transition temperature of the diene rubber" described above.

Also in Tables 4 and 5, "specific modified butadiene polymer/silica" refers to the "specific modified butadiene polymer/silica" described above.

As can be seen from Tables 4 and 5, examples in which the specific modified butadiene polymer was blended with silica at a specific quantitative ratio exhibited excellent workability, silica dispersibility, WET steering stability, and fuel efficiency, and braking performance on snow. From the comparison of Example 1-1 to Example 1-2 (comparison between aspects in which only the type of specific modified butadiene polymer differs), and the comparison of Example 2-1 to Example 2-2 (comparison between aspects in which only the type of specific modified butadiene polymer differs), Example 1-1 and Example 2-1 in which the specific modified butadiene polymer contains a functional group (specific functional group) containing a nitrogen atom and a silicon atom at a terminal exhibited superior workability, silica dispersibility, WET steering stability, fuel efficiency, and braking performance on snow.

On the other hand, Standard Example 1-1 and Standard Example 2-1, Comparative Example 1-1 and Comparative Example 2-1 in which a specific modified butadiene polymer is not contained, Comparative Example 1-2 and Comparative Example 2-2 in which a specific modified butadiene polymer is contained but the specific modified butadiene polymer/silica is less than 1.0% by mass, and Comparative Example 1-3 and Comparative Example 2-3 in which a specific modified butadiene polymer is contained but the specific modified butadiene polymer/silica is greater than 25.0% by mass exhibited insufficient either workability, silica dispersibility, WET steering stability, fuel efficiency, and braking performance on snow.

When Example 1-1 and Example 2-1 were compared to each other, Example 2-1 in which the CTAB adsorption specific surface area of the silica was 160 m$^2$/g or greater, and the silane coupling agent was the compound represented by Formula (S) above exhibited superior workability, silica dispersibility, WET steering stability, fuel efficiency, and braking performance on snow.

Similarly, when Example 1-2 and Example 2-2 were compared to each other, Example 2-2 in which the CTAB adsorption specific surface area of the silica was 160 m$^2$/g or greater, and the silane coupling agent was the compound represented by Formula (S) above exhibited superior workability, silica dispersibility, WET steering stability, fuel efficiency, and braking performance on snow.

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:

1. A rubber composition for a tire comprising:
a diene rubber;
silica; and
a modified butadiene polymer,
the diene rubber containing an aromatic vinyl-conjugated diene rubber A and at least one rubber component B selected from the group consisting of an aromatic vinyl-conjugated diene rubber b1 other than the aromatic vinyl-conjugated diene rubber A and a butadiene rubber b2 having a weight average molecular weight of greater than 15000,
the aromatic vinyl-conjugated diene rubber A being a terminal-modified aromatic vinyl-conjugated diene rubber having an aromatic vinyl content from 35 to 45% by mass and a vinyl unit content from 25 to 45% by mole,
in the diene rubber, the content of the aromatic vinyl-conjugated diene rubber A is from 50 to 90% by mass, and the content of the rubber component B is from 10 to 50% by mass,
the average glass transition temperature of the diene rubber is −45° C. or higher and lower than −20° C.,
the modified butadiene polymer being a terminal-modified butadiene polymer having a weight-average molecular weight from 1000 to 15000, and a molecular weight distribution of 2.0 or less,
a content of the silica being from 80 to 200 parts by mass per 100 parts by mass of the diene rubber, and
a content of the modified butadiene polymer being from 1.0 to 25.0% by mass with respect to the content of the silica.

2. A rubber composition for a tire comprising:
a diene rubber;
silica; and
a modified butadiene polymer,
the diene rubber containing an aromatic vinyl-conjugated diene rubber A and at least one rubber component B selected from the group consisting of an aromatic vinyl-conjugated diene rubber b1 other than the aromatic vinyl-conjugated diene rubber A and a butadiene rubber b2 having a weight average molecular weight of greater than 15000,
the aromatic vinyl-conjugated diene rubber A being a terminal-modified aromatic vinyl-conjugated diene rubber having an aromatic vinyl content from 35 to 45% by mass and a vinyl unit content from 25 to 45% by mole,
in the diene rubber, the content of the aromatic vinyl-conjugated diene rubber A is from 30 to 50% by mass, and the content of the rubber component B is from 50 to 70% by mass,
the average glass transition temperature of the diene rubber is lower than −45° C.,
the modified butadiene polymer being a terminal-modified butadiene polymer having a weight-average molecular weight from 1000 to 15000, and a molecular weight distribution of 2.0 or less,
a content of the silica being from 80 to 200 parts by mass per 100 parts by mass of the diene rubber, and
a content of the modified butadiene polymer being from 1.0 to 25.0% by mass with respect to the content of the silica.

3. The rubber composition for a tire according to claim 1 wherein the modified butadiene polymer has a functional group containing a nitrogen atom and a silicon atom at a terminal.

4. The rubber composition for a tire according to claim 1, wherein the silica has a cetyltrimethylammonium bromide (CTAB) adsorption specific surface area from 150 to 300 m$^2$/g.

5. The rubber composition for a tire according to claim 1, further comprising
a silane coupling agent,
wherein a content of the silane coupling agent is from 1 to 20% by mass based on the content of the silica.

6. The rubber composition for a tire according to claim 1 disposed in a cap tread.

7. The rubber composition for a tire according to claim 2, wherein the modified butadiene polymer has a functional group containing a nitrogen atom and a silicon atom at a terminal.

8. The rubber composition for a tire according to claim 2, wherein the silica has a cetyltrimethylammonium bromide (CTAB) adsorption specific surface area from 150 to 300 m$^2$/g.

9. The rubber composition for a tire according to claim 3, wherein the silica has a cetyltrimethylammonium bromide (CTAB) adsorption specific surface area from 150 to 300 m$^2$/g.

10. The rubber composition for a tire according to claim 7, wherein the silica has a cetyltrimethylammonium bromide (CTAB) adsorption specific surface area from 150 to 300 m$^2$/g.

11. The rubber composition for a tire according to claim 2, further comprising
a silane coupling agent,
wherein a content of the silane coupling agent is from 1 to 20% by mass based on the content of the silica.

12. The rubber composition for a tire according to claim 3, further comprising
a silane coupling agent,
wherein a content of the silane coupling agent is from 1 to 20% by mass based on the content of the silica.

13. The rubber composition for a tire according to claim 4, further comprising
a silane coupling agent,
wherein a content of the silane coupling agent is from 1 to 20% by mass based on the content of the silica.

14. The rubber composition for a tire according to claim 7, further comprising
a silane coupling agent,
wherein a content of the silane coupling agent is from 1 to 20% by mass based on the content of the silica.

15. A pneumatic tire having the rubber composition for a tire described in claim 2 disposed in a cap tread.

* * * * *